United States Patent
Nam et al.

(10) Patent No.: US 10,014,516 B2
(45) Date of Patent: Jul. 3, 2018

(54) METHOD FOR MANUFACTURING SIO-BASED CARBON NANOFIBER COMPOSITE ON BASIS OF NICKEL-COPPER CATALYST USING ELECTROPHORETIC DEPOSITION, AND METHOD FOR MANUFACTURING SECONDARY BATTERY USING SAME

(71) Applicant: Industry Academic Cooperation Foundation Keimyung University, Daegu (KR)

(72) Inventors: Ki Mok Nam, Daegu (KR); Heai Ku Park, Daegu (KR); Chang Seop Lee, Daegu (KR)

(73) Assignee: INDUSTRY ACADEMIC COOPERATION FOUNDATION KEIMYUNG UNIVERSITY, Daegu (KR)

( * ) Notice: Subject to any disclaimer, the term of this patent is extended or adjusted under 35 U.S.C. 154(b) by 185 days.

(21) Appl. No.: 15/030,856

(22) PCT Filed: Mar. 3, 2015

(86) PCT No.: PCT/KR2015/002047
§ 371 (c)(1),
(2) Date: Apr. 20, 2016

(87) PCT Pub. No.: WO2016/039514
PCT Pub. Date: Mar. 17, 2016

(65) Prior Publication Data
US 2016/0268587 A1 Sep. 15, 2016

(30) Foreign Application Priority Data
Sep. 11, 2014 (KR) .......................... 10-2014-0120193

(51) Int. Cl.
*H01M 4/04* (2006.01)
*H01M 4/587* (2010.01)
(Continued)

(52) U.S. Cl.
CPC .......... *H01M 4/0457* (2013.01); *C25D 13/02* (2013.01); *C25D 13/12* (2013.01); *H01M 4/0428* (2013.01);
(Continued)

(58) Field of Classification Search
CPC .... H01M 4/04; H01M 4/0457; H01M 4/0428; H01M 4/0492; H01M 4/587;
(Continued)

(56) References Cited

U.S. PATENT DOCUMENTS

2008/0020282 A1  1/2008  Kim et al.
2014/0021415 A1*  1/2014  Kang ................. H01M 4/0438
                                          252/502

FOREIGN PATENT DOCUMENTS

KR  10-2008-0111809 A  12/2008
KR  10-1341951 B1      12/2013
(Continued)

OTHER PUBLICATIONS

Nam, Ki-Mok et al., "Electrophoretic Deposition for the Growth of Carbon nanofibers on Ni—Cu/C-fiber Textiles", Bulletin of the Korean Chemical Society, Aug. 2014, vol. 35, No. 8, pp. 2431-2437.*
(Continued)

*Primary Examiner* — Karie O'Neill Apicella
(74) *Attorney, Agent, or Firm* — Revolution IP, PLLC

(57) ABSTRACT

Disclosed is a method for manufacturing a $SiO_2$/carbon nanofiber composite on the basis of a nickel/copper catalyst using electrophoretic deposition, and a method for manufacturing a secondary battery using the same as an anode
(Continued)

material. The method for manufacturing a $SiO_2$/carbon nanofiber composite on the basis of a nickel/copper catalyst using electrophoretic deposition including: depositing a nickel (Ni) and copper (Cu) catalyst on a carbon fiber textile by electrophoretic deposition using a carbon electrode as an anode and the carbon fiber textile as a cathode; reducing the carbon fiber textile on which the nickel and copper catalyst is deposited; growing carbon nanofiber on the reduced carbon fiber textile to by chemical vapor deposition using an ethylene gas; and coating the grown carbon nanofiber with $SiO_2$.

14 Claims, 12 Drawing Sheets

(51) Int. Cl.

| | |
|---|---|
| *H01M 4/131* | (2010.01) |
| *H01M 4/133* | (2010.01) |
| *H01M 4/134* | (2010.01) |
| *H01M 4/1395* | (2010.01) |
| *H01M 4/66* | (2006.01) |
| *H01M 4/70* | (2006.01) |
| *H01M 4/48* | (2010.01) |
| *H01M 4/1393* | (2010.01) |
| *H01M 10/0525* | (2010.01) |
| *C25D 13/12* | (2006.01) |
| *C25D 13/02* | (2006.01) |

(52) U.S. Cl.
CPC ......... *H01M 4/0492* (2013.01); *H01M 4/133* (2013.01); *H01M 4/134* (2013.01); *H01M 4/1393* (2013.01); *H01M 4/1395* (2013.01); *H01M 4/48* (2013.01); *H01M 4/483* (2013.01); *H01M 4/587* (2013.01); *H01M 4/66* (2013.01); *H01M 4/663* (2013.01); *H01M 4/70* (2013.01); *H01M 10/0525* (2013.01)

(58) Field of Classification Search
CPC .... H01M 4/133; H01M 4/131; H01M 4/1395; H01M 4/134; H01M 4/66; H01M 4/663; H01M 4/70; H01M 4/48; H01M 4/483; H01M 4/1393
See application file for complete search history.

(56) References Cited

FOREIGN PATENT DOCUMENTS

| | | |
|---|---|---|
| KR | 10-2014-0048573 A | 4/2014 |
| KR | 10-1421188 B1 | 7/2014 |

OTHER PUBLICATIONS

International Search Report for PCT/KR2015/002047 dated May 29, 2015 from Korean Intellectual Property Office.
Nam, Ki-Mok et al., "Electrophoretic Deposition for the Growth of Carbon nanofibers on Ni—Cu/C-fiber Textiles", Builetin of the Korean Chemical Society, Aug. 2014, vol. 35, No. 8, pp. 2431-2437, See pp. 2431-2432.

* cited by examiner

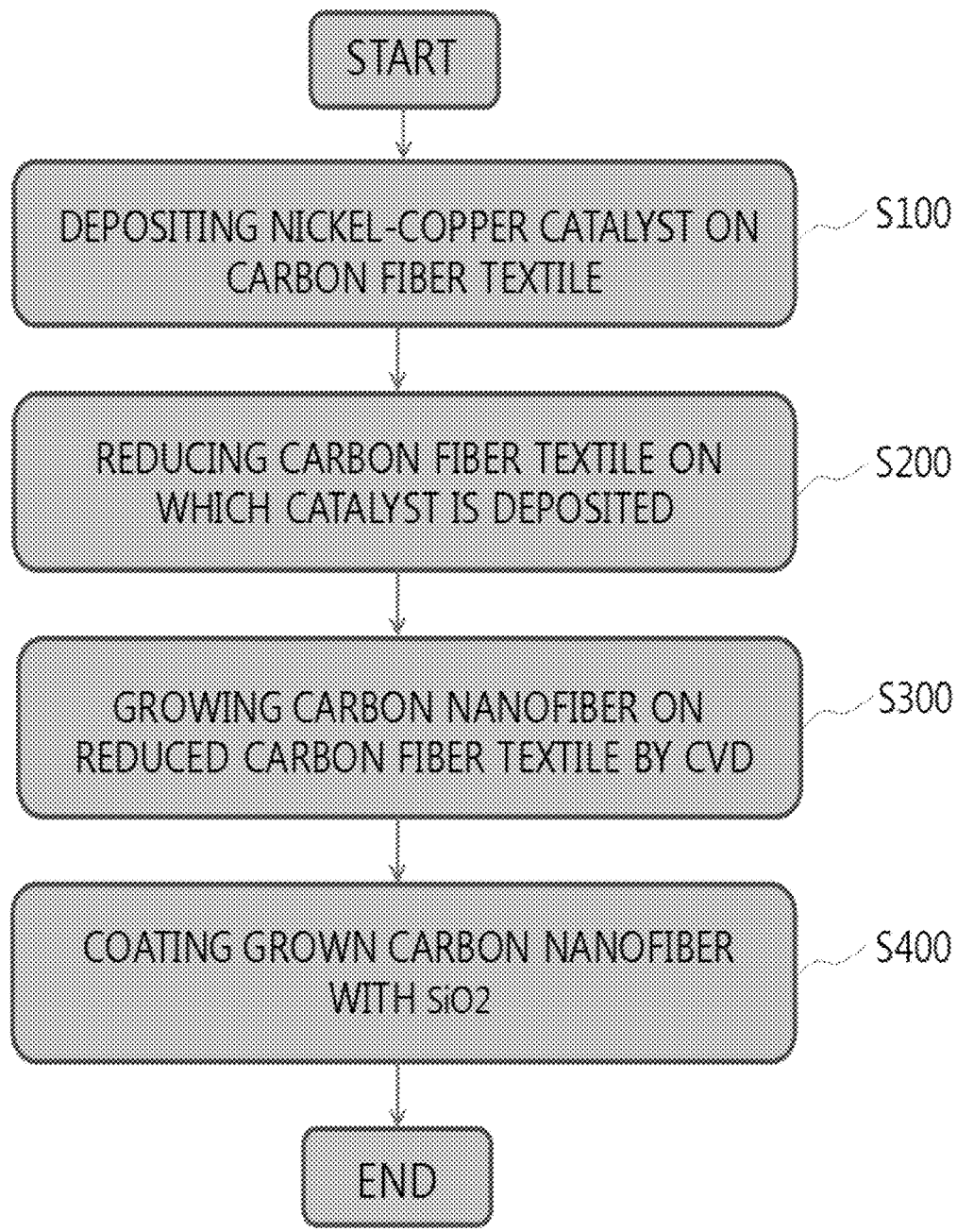

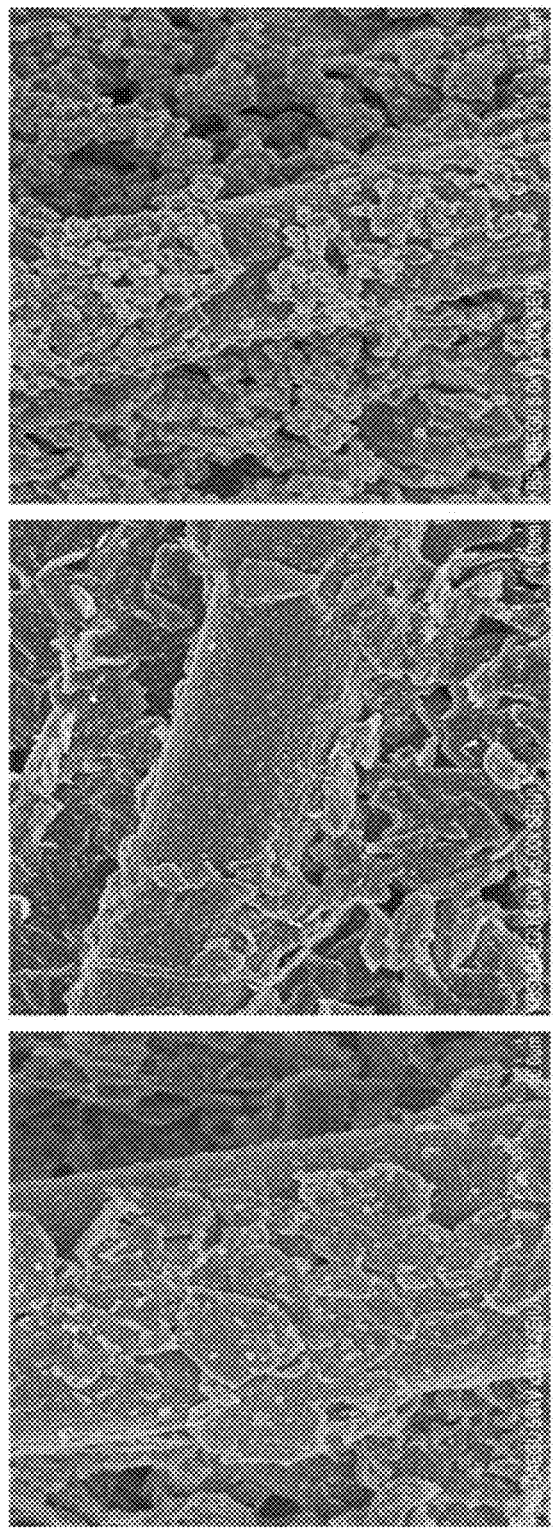
[FIG. 2]

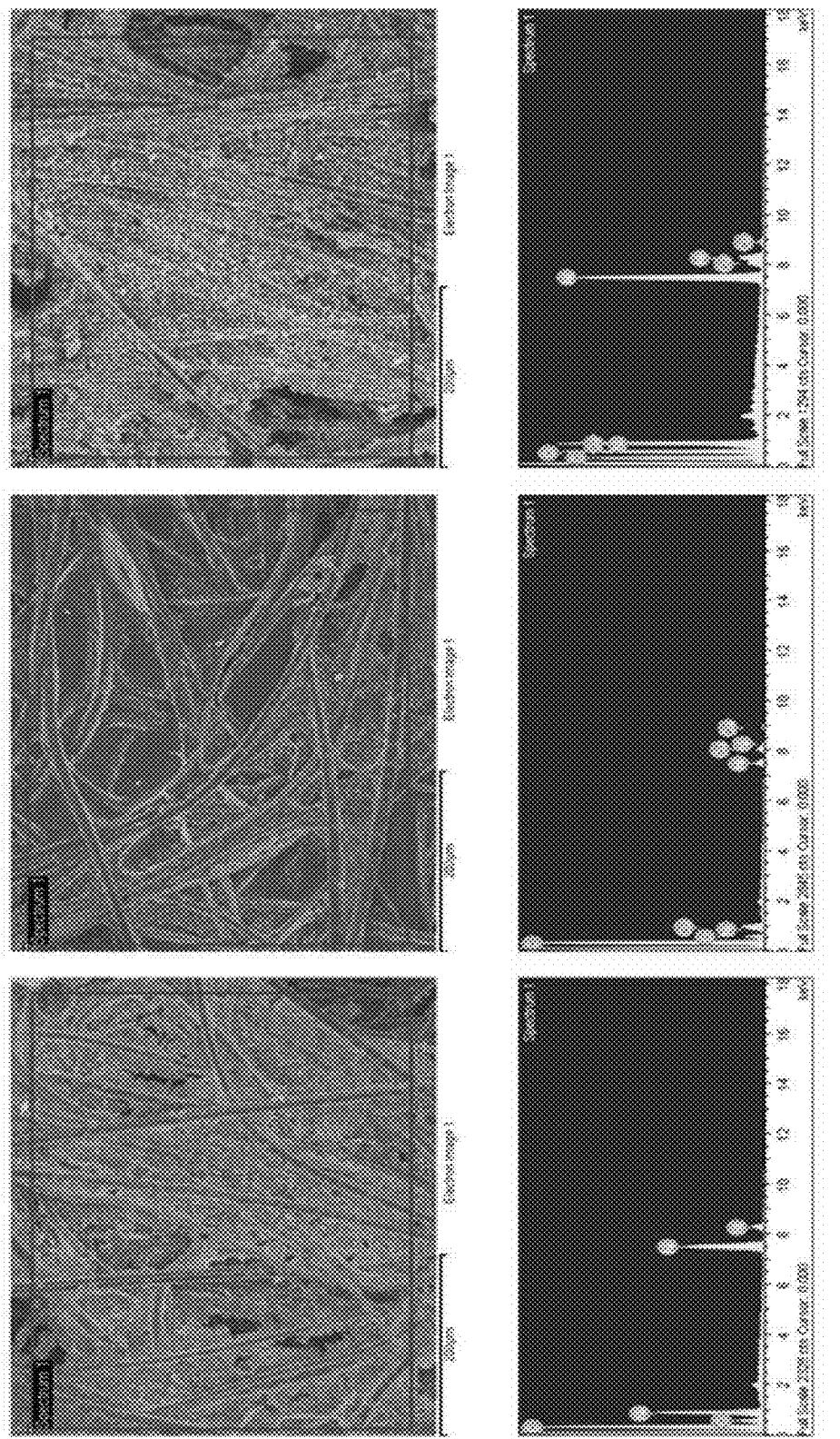
[FIG. 3]

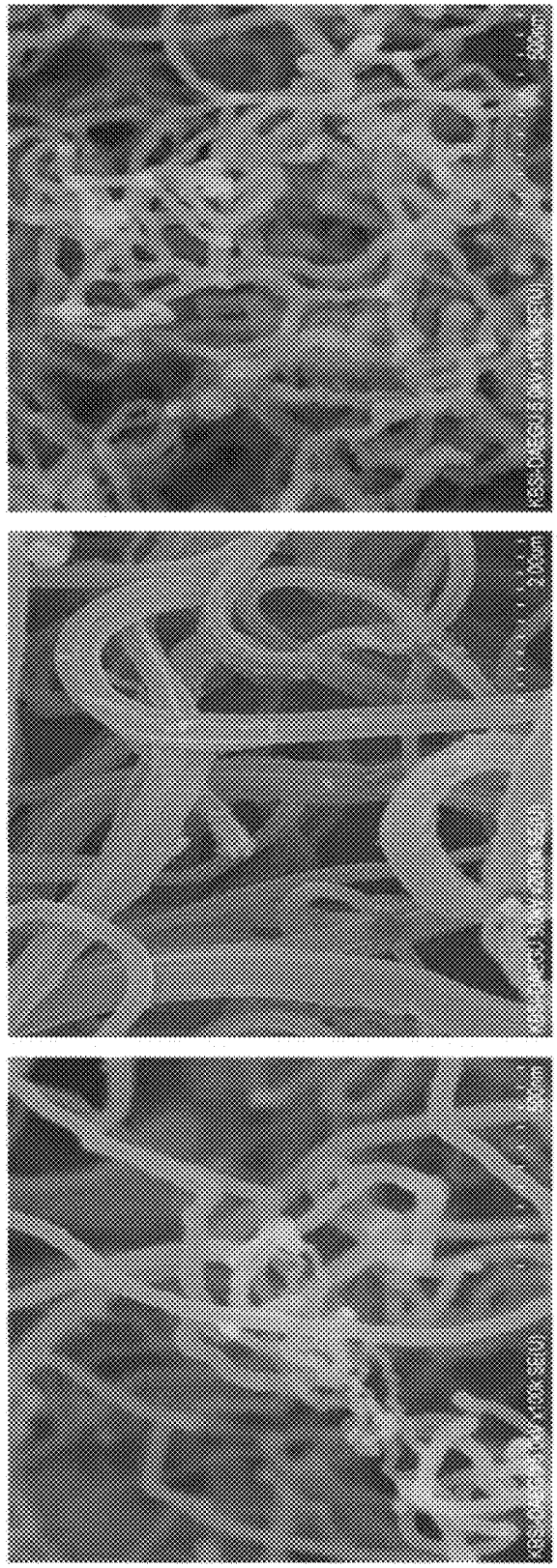
[FIG. 4]

[FIG. 5]
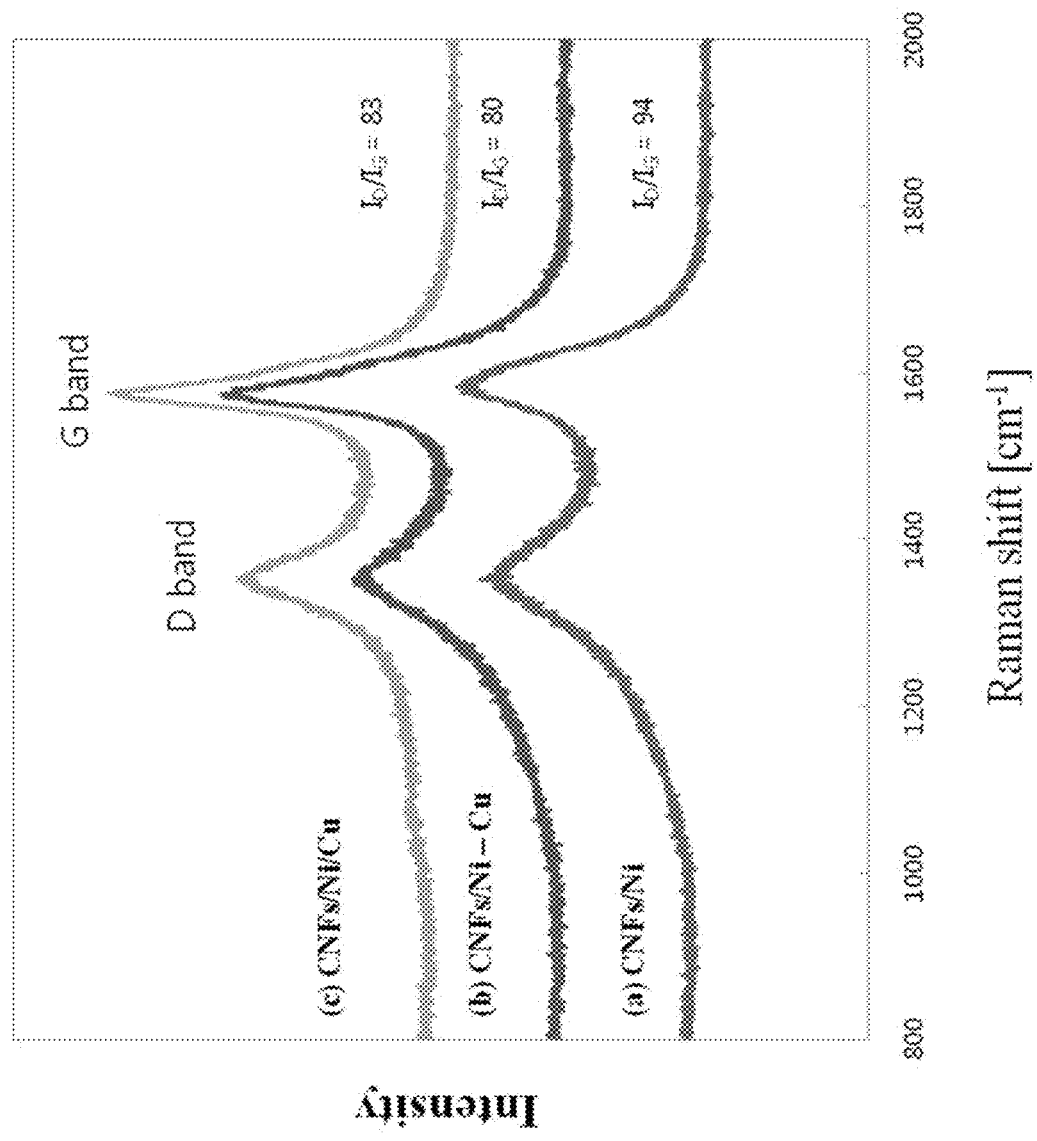

[FIG. 6]
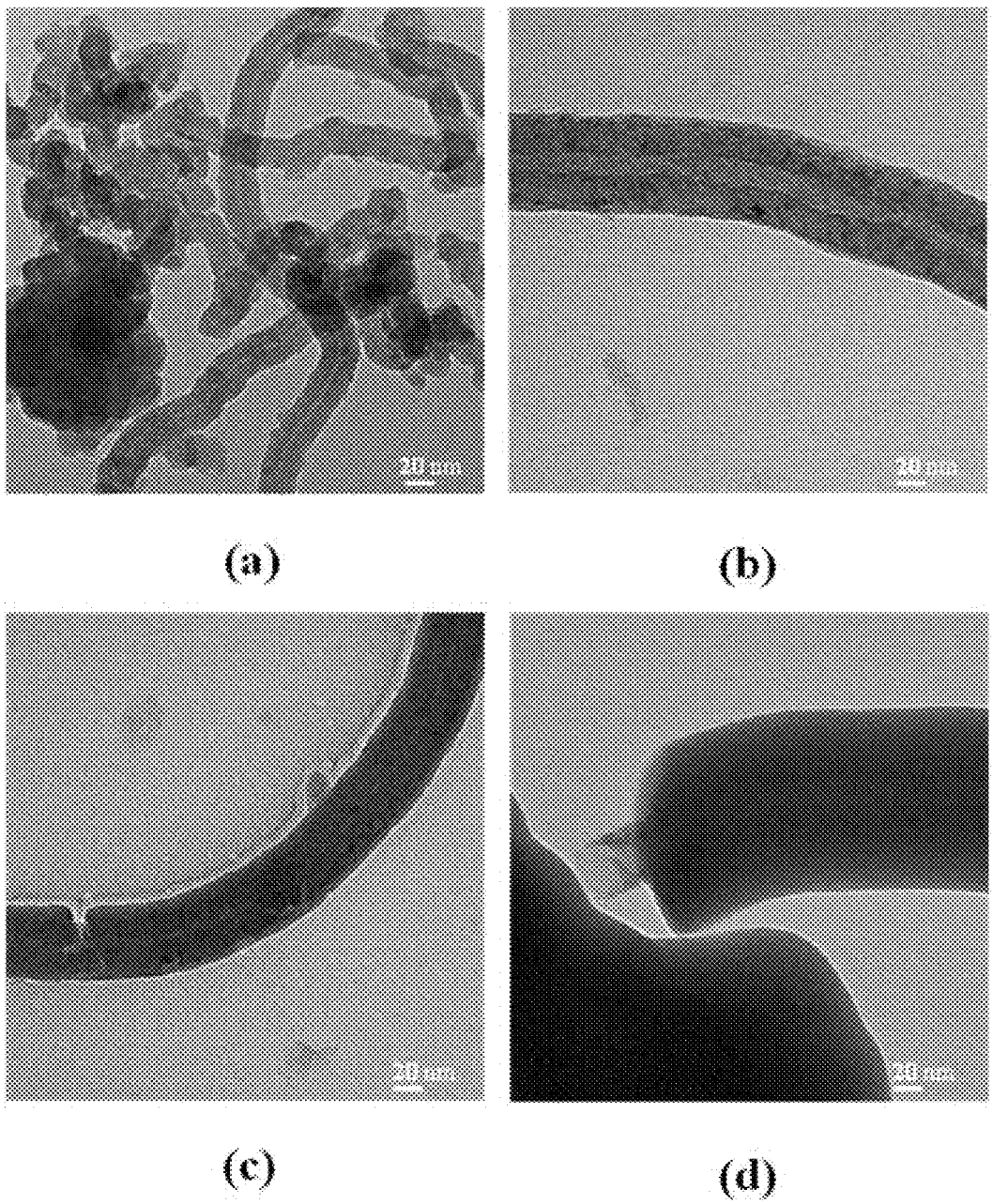
(a)  (b)
(c)  (d)

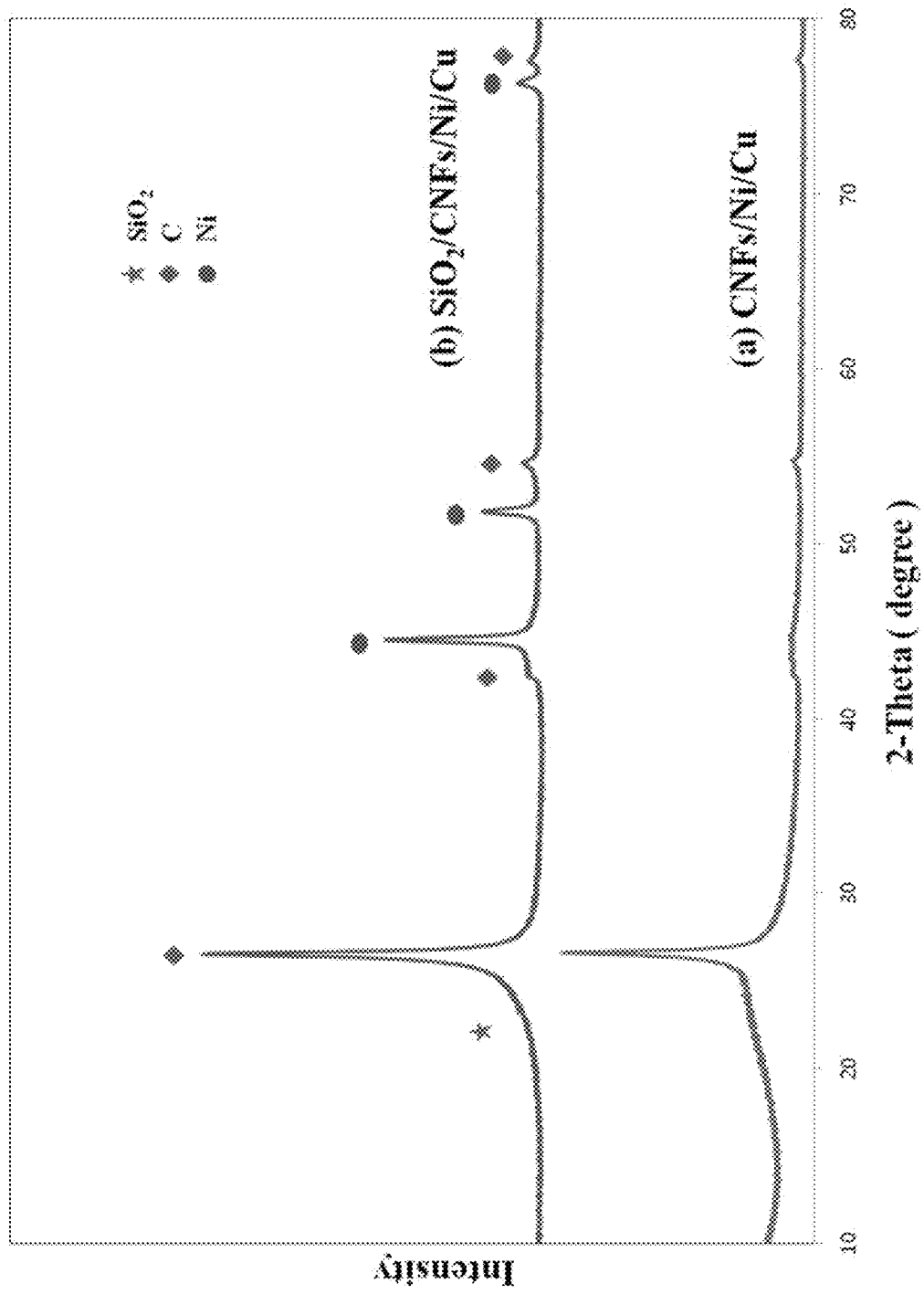
[FIG. 7]

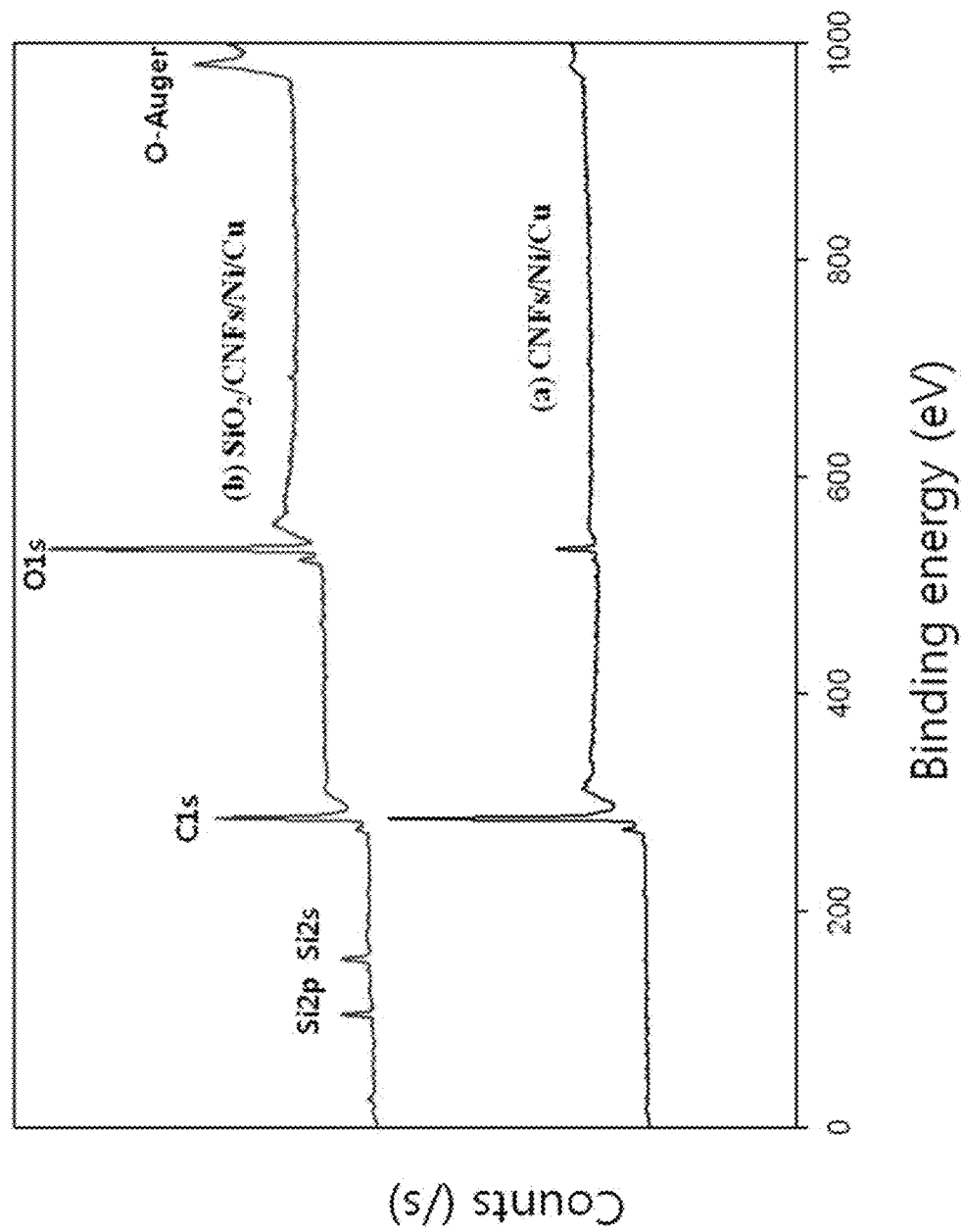
[FIG. 8]

[FIG. 9]
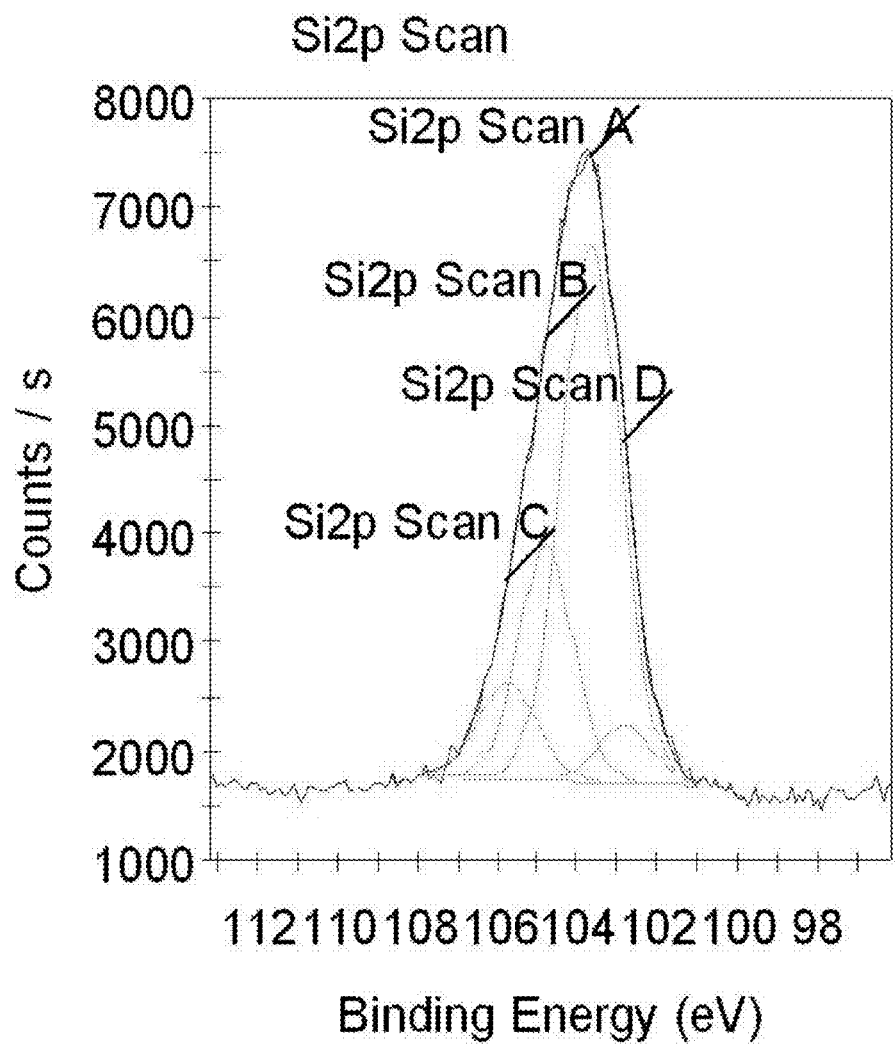

[FIG. 10]
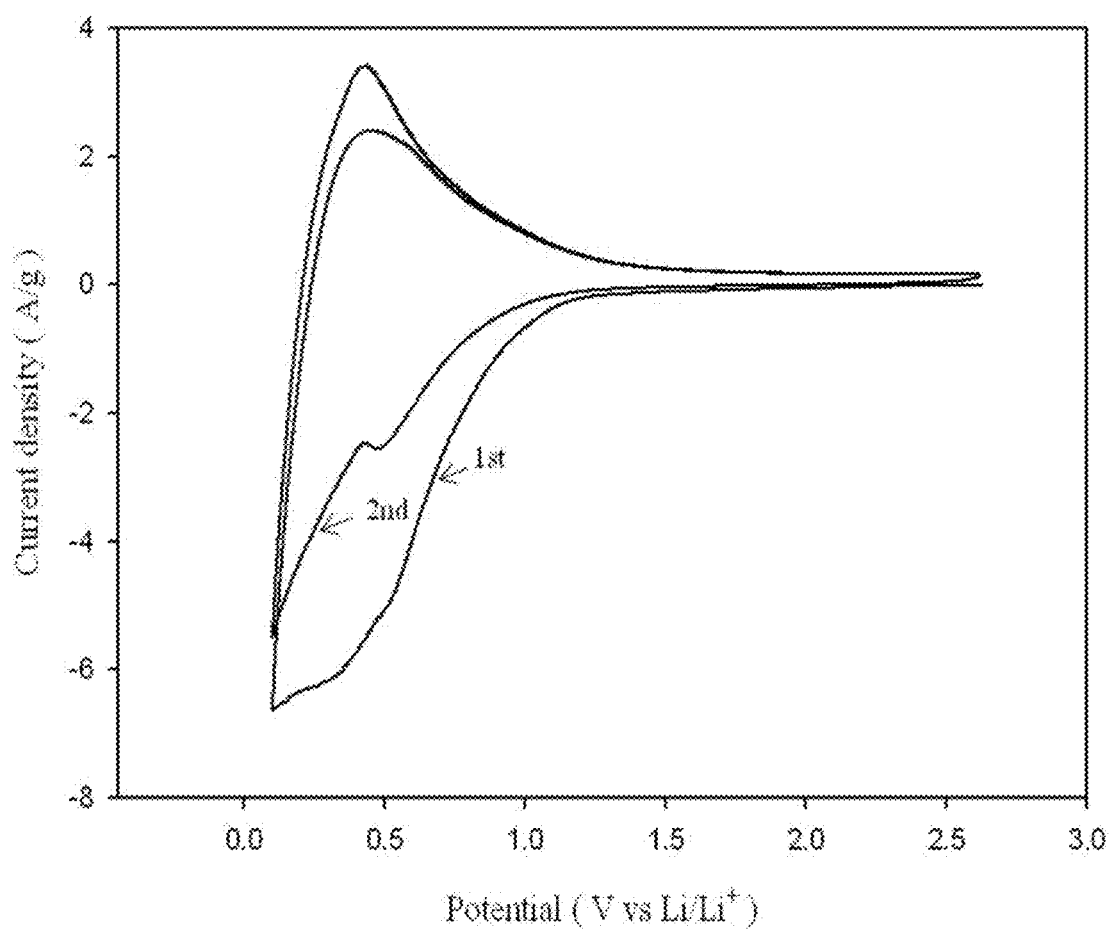

[FIG. 11]
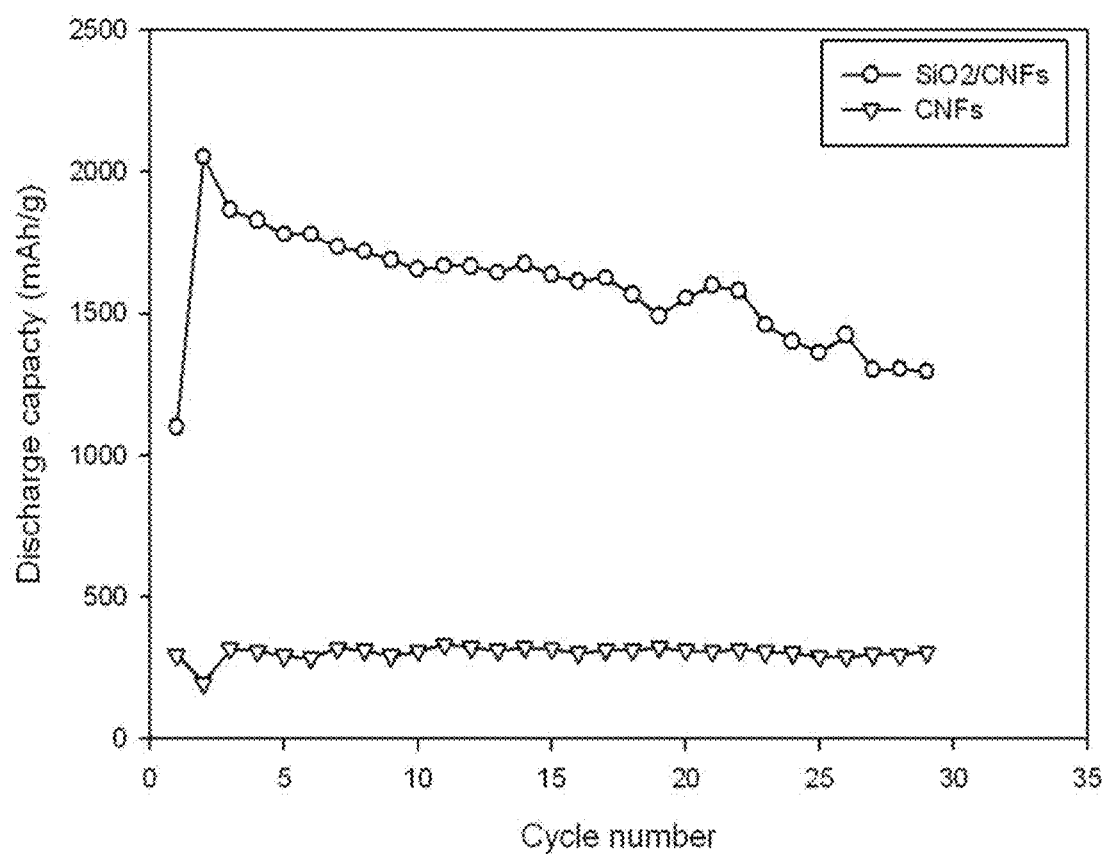

[FIG. 12]
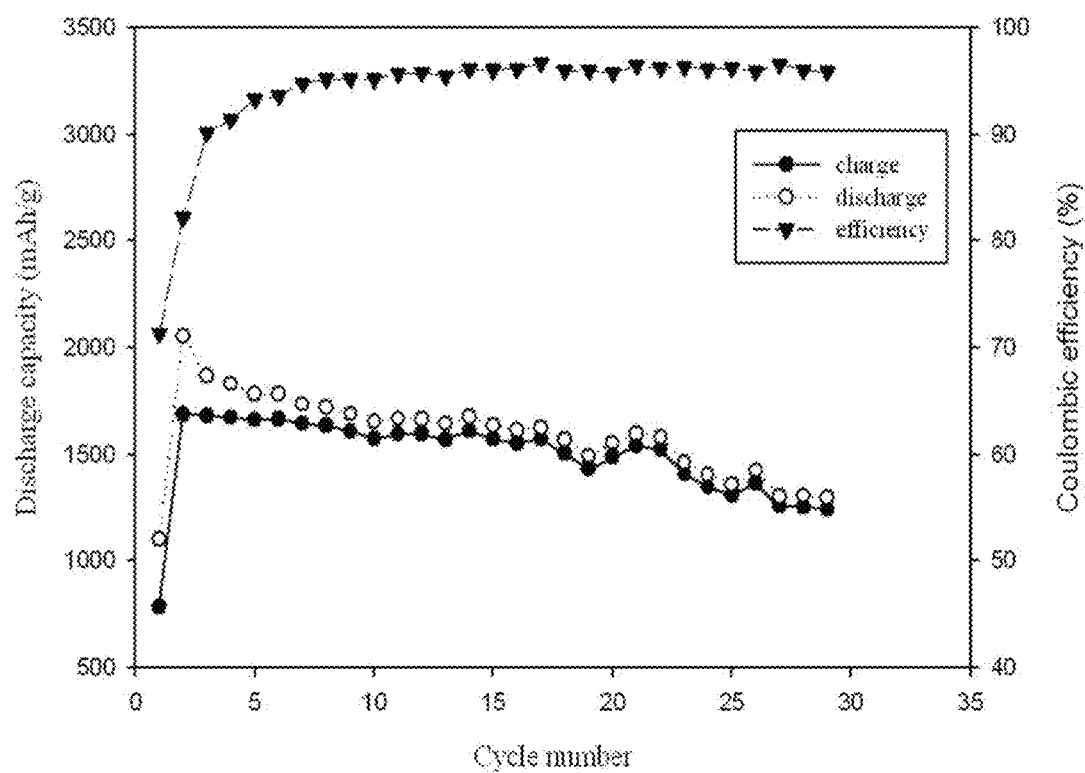

METHOD FOR MANUFACTURING SIO-BASED CARBON NANOFIBER COMPOSITE ON BASIS OF NICKEL-COPPER CATALYST USING ELECTROPHORETIC DEPOSITION, AND METHOD FOR MANUFACTURING SECONDARY BATTERY USING SAME

CROSS REFERENCE TO PRIOR APPLICATIONS

This application is a National Stage Application of PCT International Patent Application No. PCT/KR2015/002047 filed on Mar. 3, 2015, under 35 U.S.C. § 371, which claims priority to Korean Patent Application No. 10-2014-0120193 filed on Sep. 11, 2014, which are all hereby incorporated by reference in their entirety.

TECHNICAL FIELD

The present invention has been made by Task No. 2012026209 under the support of the Ministry of Education, Republic of Korea, the research management professional organization of the project is the National Research Foundation of Korea, the research project title is the "Regional Innovation Personnel Training Project", the research project title is the "Synthesis of Carbon Nanotubes on Basis of Transition Metal Catalyst and Application Thereof To Electrode Material", the leading organization is the Industry-Academic Cooperation Foundation, Keimyung University, and the research period is from Jan. 1, 2013 to Jun. 30, 2014.

The present invention relates to a method for manufacturing a carbon nanofiber composite and a secondary battery, and more particularly, to a method for manufacturing a $SiO_2$/carbon nanofiber composite on the basis of a nickel/copper catalyst using electrophoretic deposition and a method for manufacturing a secondary battery using the same as an anode material.

BACKGROUND ART

Carbon nanofiber means a fibrous material, which includes 90% or more of carbon components and has a diameter of less than 1 μm, and may be manufactured by a method such as electrospinning, chemical vapor deposition, and laser evaporation. Since carbon nanofiber grown by the method forms sp, sp2, and sp3 hybrid bonds, and has flexibility, high strength, and high elasticity together with heat resistance, chemical stability, high electrical conductivity, mechanical strength, and a high specific surface area, it is possible to apply the carbon nanofiber to various fields from advanced materials, such as electrode materials of secondary batteries and fuel cells, catalytic agents, sensor materials, and electromagnetic wave shielding materials, to life science.

Carbon-based materials used as an anode material of a lithium secondary battery have a maximum charge capacity of 372 mAh/g, may reversibly intercalate/deintercalate only one lithium ion per 6 carbon atoms, and thus have a limitation in capacity. As a material capable of complementing the limitation, silicon is used, and silicon is capable of intercalating and deintercalating lithium due to the crystal structure thereof, and has a maximum charge capacity of about 4,000 mAh/g, which is 10 times larger than that of carbon-based materials. However, silicon has problems in that electrical conductivity deteriorates, and during the intercalation and deintercalation of lithium ions, the volume of the crystal structure is changed by 300% or more and the change in particle size is so great that the cycle does not reversibly proceed.

In order to suppress the change in volume of silicon and stabilize the anode structure, numerous inventions for improving the lifespan and capacity of an electrode have been conducted using nanoparticlulation of silicon and materials such as a silicon-metal alloy, a silicon-non-metal alloy, and a silicon-carbon composite.

DISCLOSURE

Technical Problem

In order to solve the aforementioned problems, an object of the present invention is to provide a method for manufacturing a lithium secondary battery anode material with improved performance, and a method for manufacturing a lithium secondary battery with high charge and discharge efficiency, using the same.

The other objects and advantages of the present invention will be more apparent from the following detailed description of the invention and claims.

Technical Solution

A first feature of the present invention for solving the aforementioned problems includes: (a) depositing a nickel (Ni) and copper (Cu) catalyst on a carbon fiber textile by electrophoretic deposition using a carbon electrode as an anode and the carbon fiber textile as a cathode; (b) reducing the carbon fiber textile on which the nickel and copper catalyst is deposited; (c) growing carbon nanofiber on the reduced carbon fiber textile by chemical vapor deposition (CVD) using an ethylene gas; and (d) coating the grown carbon nanofiber with $SiO_2$.

Here, it is preferred that step (a) is a step of depositing nickel on the carbon fiber textile in an aqueous nickel-copper mixed solution, and it is preferred that step (a) includes: depositing the copper on the carbon fiber textile; and depositing nickel on the carbon fiber textile on which the copper is deposited in an aqueous nickel solution.

Further, preferably, in step (b), the carbon fiber textile on which the nickel and copper catalyst is deposited may be reduced using an $H_2/N_2$ gas in the tube furnace, and in step (c), the carbon nanofiber may be grown by performing a reaction in the tube furnace, and using a mass flow rate controller (MFC) to flow a hydrogen gas together with the ethylene gas.

Moreover, it is preferred that step (c) includes: introducing the carbon fiber textile, on which the nickel and copper catalyst is deposited, into a tube furnace of a reactor, and heating the carbon fiber textile to 700° C. at a rate of 12° C./min and flowing a nitrogen ($N_2$) gas; and flowing a nitrogen gas including 20% of hydrogen into the reactor for 2 hours, and it is preferred that step (d) includes: (d1) oxidizing the grown carbon nanofiber in nitric acid to wash the carbon nanofiber with distilled water; and (d2) dissolving TEOS in ethyl alcohol to form a TEOS solution, and dispersing the carbon nanofiber in the TEOS solution to perform a reaction.

Here, in step (d2), it is preferred that the reaction is performed at 50° C. for 24 hours by dispersing the carbon nanofiber and adding ammonia water thereto.

Moreover, a second feature of the present invention includes: (a) depositing a nickel and copper catalyst on a carbon fiber textile by electrophorectic deposition using a carbon electrode as an anode and the carbon fiber textile as a cathode; (b) reducing the carbon fiber textile on which the nickel and copper catalyst is deposited; (c) growing carbon nanofiber on the reduced carbon fiber textile to by chemical vapor deposition using an ethylene gas; (d) coating the grown carbon nanofiber with $SiO_2$; and (e) manufacturing a three-electrode secondary battery composed of the coated carbon nanofiber as a working electrode (WE), Li metal as a counter electrode (CE) and a reference electrode, and a separation membrane containing an electrolyte.

Here, it is preferred that step (a) is a step of depositing nickel on the carbon fiber textile in an aqueous nickel-copper mixed solution, and it is preferred that step (a) includes: depositing the copper on the carbon fiber textile; and depositing nickel on the carbon fiber textile on which the copper is deposited in an aqueous nickel solution.

In addition, preferably, step (d) may include: (d1) oxidizing the grown carbon nanofiber in nitric acid to wash the carbon nanofiber with distilled water; and (d2) dissolving TEOS in ethyl alcohol to form a TEOS solution, and dispersing the carbon nanofiber in the TEOS solution to perform a reaction, and step (d2) may be a step in which a reaction is performed at 50° C. for 24 hours by dispersing the carbon nanofiber and adding ammonia water thereto.

Furthermore, it is preferred that the electrolyte is formed by dissolving $LiCO_4$ in a solution in which propylene carbonate and ethylene carbonate are mixed at a ratio of 1:1.

Advantageous Effect

As described above, the present invention provides a method for manufacturing a carbon nanofiber by chemical vapor deposition using a Ni—Cu bimetallic catalyst, and furthermore, the present invention provides a method for synthesizing or manufacturing a $SiO_2$/CNFs composite by mixing Si particles and a Ni—Cu catalyst, thereby providing a method for simply and easily manufacturing an anode material of a lithium secondary battery having good-quality electrochemical characteristics.

Further, the present invention provides a method for manufacturing a good-quality lithium secondary battery having high charge and discharge efficiency, a high capacity, and a long lifespan using the manufactured anode material.

DESCRIPTION OF DRAWINGS

FIG. 1 is a view illustrating the flow of a method for manufacturing a $SiO_2$/carbon nanofiber composite on the basis of a nickel/copper catalyst using electrophoretic deposition according to an exemplary embodiment of the present invention, FIG. 2 is SEM photographs of samples in which (a) a Ni catalyst, (b) a Ni—Cu catalyst, and (c) a Ni catalyst on the Cu pre-deposited are deposited on carbon fiber textiles, respectively, FIG. 3 is EDS results of the catalysts deposited on the carbon fiber textiles, FIG. 3 illustrates the results of (a) a case where a Ni catalyst is deposited, (b) a case where a Ni—Cu catalyst is deposited, and (c) a case where a Ni catalyst is deposited on the Cu pre-deposited, FIG. 4 is SEM photographs of samples in which (a) a Ni catalyst, (b) a Ni—Cu catalyst, and a Ni/Cu catalyst are deposited on the carbon fiber textiles, respectively, FIG. 5 is a Raman analysis result for the carbon nanofibers grown under the aforementioned three conditions, FIG. 6 is TEM photographs illustrating the structure of carbon nanofiber grown on a carbon fiber textile and the structure of a $SiO_2$ coating layer on a synthesized $SiO_2$/CNFs composite, FIG. 7 is XRD analysis results of (a) the carbon nanofiber and (b) the $SiO_2$/CNFs, FIG. 8 is measurement results of the XPS survey spectra in order to confirm whether the carbon nanofiber and the carbon nanofiber coated with $SiO_2$ are coated, FIG. 9 is a result illustrating the hyperfine spectrum of Si measured in order to investigate the binding aspect of Si—O which forms a coating layer, FIG. 10 is a cyclic voltammogram when the carbon nanofiber is used as an anode material of a secondary battery according to an exemplary embodiment of the present invention, FIG. 11 is change curves of a discharge capacity for investigating cycling stability when the carbon nanofiber and $SiO_2$/CNFs are used as an anode material of the Li secondary battery, and FIG. 12 is curves of capacity versus cycle number in $SiO_2$/CNFs.

BEST MODE

Hereinafter, preferred exemplary embodiments of the present invention will be described in detail with reference to the accompanying drawings. However, the following exemplary embodiments are provided only for the purpose of illustration in order to help the understanding of the present invention, and the scope of the present invention is not limited only thereto.

FIG. 1 is a view illustrating the flow of a method for manufacturing a $SiO_2$/carbon nanofiber composite on the basis of a nickel/copper catalyst using electrophoretic deposition according to an exemplary embodiment of the present invention, As illustrated in FIG. 1, a method for manufacturing a $SiO_2$/carbon nanofiber composite according to the exemplary embodiment of the present invention includes: (a) depositing a nickel (Ni) and copper (Cu) catalyst on a carbon fiber textile by electrophorectic deposition using a carbon electrode as an anode and the carbon fiber textile as a cathode; (b) reducing the carbon fiber textile on which the nickel and copper catalyst is deposited; (c) growing carbon nanofiber on the reduced carbon fiber textile by chemical vapor deposition (CVD) using an ethylene gas; and (d) coating the grown carbon nanofiber with $SiO_2$.

As described above, in the exemplary embodiment of the present invention proposes a method for synthesizing an $SiO_2$/carbon nanofiber composite by depositing a Ni and Cu catalyst on a carbon fiber textile by electrophoretic deposition used for growing carbon nanofiber, growing carbon nanofiber on the carbon fiber textile by chemical vapor deposition using an ethylene gas as a carbon source, and hydrolyzing tetraethyl orthosilicate (TEOS) to coat the surface of the carbon nanofiber with $SiO_2$, and physicochemical and electrochemical characteristics of the composite manufactured by the method were investigated.

<Materials and Tools>

Reagents and gases used in the present invention are shown in the following [Table 1] and [Table 2]. The carbon fiber textile used as a substrate was purchased from the SGL Carbon Group, Germany and used.

TABLE 1

| Reagents | Molecular formula | Specification | Manufacturer |
| --- | --- | --- | --- |
| C-fiber textiles | C | | SGL Carbon Group, Germany |
| Tetraethyl orthosilicate | $Si(OCH_3)_4$ | 98% | Sigma-Aldrich, USA |
| Ammonia water | $NH_4OH$ | 25% | Duksan, Korea |
| Ethyl alcohol | $CH_3CH_2OH$ | 64% | Duksan, Korea |
| Nickel(II) Acetate tetrahydrate | $Ni(CH_3CO_2)_2 \cdot 4H_2O$ | 97% | Duksan, Korea |
| Copper(II) Acetate monohydrate | $Cu(CH_3CO_2)_2 \cdot H_2O$ | 98% | Duksan, Korea |
| Nitric acid | $HNO_3$ | 65% | Duksan, Korea |

TABLE 2

| Gas | Molecular formula | Specification | Manufacturer |
| --- | --- | --- | --- |
| $N_2$ gas | $N_2$ | 99% | KOREA Standard gas |
| $H_2$ gas | $H_2$ | 20% | KOREA Standard gas |
| Ethylene gas | $C_2H_2$ | 20% | KOREA Standard gas |

Deposition of Catalyst (Step (a))

A Ni and Cu catalyst was deposited on a carbon fiber textile by electrophoretic deposition. In the electrophoretic deposition, a carbon electrode was used as an anode and a carbon fiber textile was used as a cathode, and the interval between the electrodes was set to 85 mm. For the deposition of the catalyst on the carbon fiber textile, experiments were performed under three conditions.

First, Ni was deposited on a carbon fiber textile in an aqueous Ni solution, and secondly, Ni and Cu were deposited on the carbon fiber textile in an aqueous Ni—Cu mixed solution, and thirdly, Cu was pre-deposited on the carbon fiber textile, and then Ni was deposited on the carbon fiber textile on which Cu was deposited in an aqueous Ni solution.

Reduction (Step (b))

In order to remove hydroxyl groups present on the surface of the carbon fiber textile, which did not participate in the reaction, after the electrophoretic deposition process, the reduction was performed. A tube furnace was used to perform the reduction using $H_2/N_2$ gas at 700° C. for 3 hours, and the flow rate was controlled through an MFC.

Growth of Carbon Nanofiber (Step (c))

After the reduction process was completed, the carbon nanofiber on the basis of the Ni—Cu catalyst was grown in the tube furnace. As in the reduction process, the reaction was performed in the tube furnace, and all the flow rates of gases were controlled through the MFC. An ethylene gas was used as a carbon source, and a hydrogen gas was flowed together in order to remove hydroxyl groups, which may remain after the reduction process, and enhance the yield.

Under the nitrogen atmosphere, the temperature was increased to 700° C. at a rate of 12° C. per minute, and ethylene ($C_2H_4$), hydrogen, and nitrogen gases were flowed at 700° C. for 3 hours. After the reaction was completed at 700° C., the temperature was decreased to normal temperature under the nitrogen atmosphere.

Coating of Carbon Nanofiber with $SiO_2$ (Step (d))

In order to coat the surface of the carbon nanofiber with $SiO_2$, a hydroxyl group was first introduced as an anchor group, and for this purpose, the carbon nanofiber was subjected to oxidation process for 30 minutes in nitric acid maintained at 80° C., and then was washed with distilled water. In order to manufacture a composite by coating the carbon nanofiber with $SiO_2$, TEOS was dissolved in ethyl alcohol, and then the carbon nanofiber grown on the carbon fiber textile was dispersed in the solution, and ammonia water was added thereto to perform a reaction at 50° C. for 24 hours.

Moreover, as another exemplary embodiment of the present invention, a method for manufacturing a three-electrode secondary battery using the carbon nanofiber coated with $SiO_2$ is proposed (not illustrated).

As the anode used for manufacturing the three-electrode secondary battery, the carbon nanofiber grown on the carbon fiber textile was used as it was, and the anode was used as a working electrode, and lithium metal was used as a counter electrode and a reference electrode, and a three-electrode cell, which uses an electrolyte in which $LiClO_4$ was dissolved in a solution of propylene carbonate and ethylene carbonate mixed at 1:1, was assembled in a glove box. For the assembled cell, electrochemical properties and charge and discharge capacities were investigated using the cyclic voltammetry and the galvanostatic charge-discharge (Solartron 1287 electrochemical interface).

<Analysis>

Through the scanning electron microscopy (SEM, Hitachi, S-4800), the deposition state of the catalyst and the growth of the carbon nanofiber were observed on the surface of the substrate according to the voltage and the catalyst. Through the energy dispersive spectroscopy (EDS, Thermo ARL, ARL-3460), the amounts and compositions of two catalysts deposited on the surface were analyzed. Through the Raman spectroscopy (Horiba Jobin Yvon, LabRAM HR-800), the intensity ratio of the G-band and the D-band and the crystallinity of the carbon nanofiber were analyzed. Through the X-ray diffraction (XRD, PANalytical, X'pert PRO-MPD) analysis, the crystallinity of the catalyst, the carbon nanofiber, and $SiO_2$ were investigated. The binding aspect was analyzed by measuring the binding energy of carbon and $SiO_2$ through the X-ray photoelectron spectroscopy (XPS, Thermo Fisher Scientific, Multilab-2000).

<Result and Discussion>

SEM Photographs of Catalyst

By electrophoretic deposition, a Ni catalyst, a Ni—Cu catalyst, and a Ni/Cu catalyst were deposited on a carbon fiber textile while voltage was varied. The reason for introducing the Ni/Cu system into the carbon fiber textile is because the self diffusion coefficient of Cu is $3.05 \times 10^{-11}$ $cm^{-2}/s$ which is higher than $2.88 \times 10^{-14}$ $cm^{-2}/s$ that is the self diffusion coefficient of Ni, and thus Cu atoms diffuse into the outermost Ni layer due to a simple heat treatment, such that it was expected that the characteristics of the grown carbon nanofiber of the Ni/Cu system would be different from those of the Ni and N—Cu catalyst systems.

FIG. 2 is SEM photographs of samples in which (a) a Ni catalyst, (b) a Ni—Cu catalyst, and (c) a Ni catalyst on the Cu pre-deposited are deposited on carbon fiber textiles, respectively.

As illustrated in FIG. 2, in the SEM photographs of FIGS. 2(a) and (b), the deposition aspects of the catalysts were shown almost similarly, but in FIG. 2(c), a slightly different deposition aspect could be seen, and it could be confirmed that Ni was deposited in the form of particles on the Cu layer first deposited on the Cu pre-deposited layer.

EDS Result of Catalyst Deposited on Carbon Fiber Textile

In order to analyze the content of catalyst deposited on the carbon fiber textile, an EDS analysis was performed. FIG. 3 is EDS results of the catalysts deposited on the carbon fiber textiles. FIG. 3 illustrates the results of (a) a case where a Ni catalyst is deposited, (b) a case where a Ni—Cu catalyst is deposited, and (c) a case where a Ni catalyst is deposited on the Cu pre-deposited. The content of Ni was 7.06% in FIG. 3(a), the ratio of Ni and Cu was almost 1:1 in FIG. 3(b), and the contents of Ni and Cu were 12% and 0.28%, respectively in FIG. 3(c), and it could be seen that the catalyst exposed to the surface was Ni.

Moreover, the next [Table 3] exhibits the EDS result of catalyst deposited on the carbon fiber textile.

TABLE 3

| Name | C (at %) | O (at %) | Ni (at %) | Cu (at %) |
|---|---|---|---|---|
| Ni | 82.78 | 10.15 | 7.06 | 0 |
| Ni—Cu | 84.61 | 12.91 | 1.29 | 1.19 |
| Ni/Cu | 57.35 | 30.27 | 12.10 | 0.28 |

SEM Photograph of Grown Carbon Nanofiber

FIG. 4 is SEM photographs of samples in which (a) a Ni catalyst, (b) a Ni—Cu catalyst, and (c) a Ni/Cu catalyst are deposited on carbon fiber textiles. As illustrated in FIG. 4, in the case of (a) in which carbon nanofiber was grown by using only Ni as a catalyst, the average diameter was 40 nm and a Y-shaped carbon nanofiber was grown.

The growth of the carbon nanofiber in FIG. 4(a) is a Y-shaped carbon nanofiber like a kind of branch, in which the carbon nanofiber is grown such that a catalyst is separated into two sections, whereas the carbon nanofiber grown in FIG. 4(b) was grown as Y-shaped carbon nanofiber grown in various directions from one catalyst, which seems to relate to the size of catalyst formed as can be seen even in the difference in average diameter. Meanwhile, in the case of FIG. 4(c) in which Ni was deposited on the carbon fiber textile on which Cu was pre-deposited, the Y-shaped carbon nanofiber was not observed, and the growth of twisted carbon nanofiber having a uniform diameter of 33 nm, which is a relatively small average diameter, was observed. It is thought that the deposition aspect of the catalyst particles and the introduction of Cu affect the growth mechanism of the carbon nanofiber.

Raman Analysis of Carbon Nanofiber

FIG. 5 is a Raman analysis result for the carbon nanofibers grown under the aforementioned three conditions. As illustrated in FIG. 5, the D-band appearing in the vicinity of 1350 cm$^{-1}$ indicates a non-uniform graphite structure, and the G-band appearing in the vicinity of 1590 cm$^{-1}$ indicates a uniform graphite structure. The D-band results from impurities other than the carbon nanofiber or the structural defects of graphite by SP$^3$, and the G-band means that graphitized carbon nanofiber composed of SP$^2$ is present.

The increase in intensity ratio (D/G) of the D-band/G-band means that due to the increase in D-band, the content of impurities or structural defect is high in the carbon nanofiber, which means that the crystallization degree of the carbon nanofiber is low.

As illustrated in FIG. 5, the intensity of the G-band in FIG. 5(a) was lower than those in FIGS. 5(b) and 5(c), and the D/G ratio was (a) 0.94, which was higher than (b) 0.80 and (c) 0.83. This means that the crystallization degrees of the carbon nanofibers grown in FIGS. 5(b) and 5(c) are high, and that carbon nanofiber with a higher graphitization degree than that in FIG. 5(a) was grown. Further, it can be interpreted that Cu used as a co-catalyst contributes to the growth of carbon nanofiber with a high crystallization degree.

TEM Photograph of SiO$_2$/Carbon Nanofiber

In order to confirm the structure of the carbon nanofiber grown on the carbon fiber textile and the structure of the SiO$_2$ coating layer in the synthesized SiO$_2$/CNFs composite, the TEM photographs were analyzed, and are illustrated in FIG. 6. For the carbon nanofiber used for the manufacture of the SiO$_2$/CNFs composite, carbon nanofiber having a relatively high crystallization degree and a uniform diameter, which was grown under the catalyst condition (c), was used in the Raman result.

As illustrated in FIG. 6(a), the TEM image of the carbon nanofiber was exhibited as carbon nanofiber in the form of a wire in which the graphite layer was surrounded in many folds and the core thereof has a micro hollow. Further, the TEM photographs in SiO$_2$/CNFs (b, c, and d) exhibit that SiO$_2$ formed by a hydrolysis reaction of TEOS is uniformly coated on the carbon nanofiber to constitute a layer.

XRD

FIG. 7 is XRD analysis results of (a) the carbon nanofiber and (b) the SiO$_2$/CNFs. As illustrated in FIG. 7(a), only C characteristic peaks of Ni deposited on the carbon fiber textile and carbon nanofiber appeared in the XRD pattern of FIG. 7(a), but in the XRD pattern in FIG. 7(b), the C peak of the carbon nanofiber except for Ni and a broad SiO$_2$ peak could be confirmed. This means that Ni is purified during the oxidation process through the acid treatment of the carbon nanofiber, and the amorphous SiO$_2$ is coated on the surface of the carbon nanofiber.

XPS

The XPS survey spectra were measured in order to confirm whether the carbon nanofiber and the carbon nanofiber coated with SiO$_2$ are coated, and the results are illustrated in FIG. 8. FIG. 8(a) illustrates the C1s exhibiting the structure of sp$^{2-}$ and sp$^{3-}$ of the carbon nanofiber and FIG. 8(b) illustrates Si2p and O1s, which means that SiO$_2$ is coated on the carbon nanofiber.

FIG. 9 illustrates the hyperfine spectrum of Si measured in order to investigate the binding aspect of Si—O which forms a coating layer. As illustrated in FIG. 9, the Si2p scan of SiO$_2$/CNFs illustrates Si2p A to D ([Table 4]) corresponding to SiO, SiO$_2$, and SiO$_x$, which means that the coating layer constitutes a siloxane network.

TABLE 4

| Element | Component | Name | Binding energy | Chemical bonding |
|---|---|---|---|---|
| Si | SiO$_2$/CNF | Si2p Scan A | 102.81 | SiO$_x$ |
| | | Si2p Scan B | 103.66 | |
| | | Si2p Scan C | 104.79 | |
| | | Si2p Scan D | 105.74 | |

Cyclic Voltammetry

FIG. 10 is a cyclic voltammogram when the carbon nanofiber is used as an anode material of a secondary battery according to an exemplary embodiment of the present invention. (the case where SiO$_2$/CNFs was used as an anode material of a Li secondary battery at a potential window of 0.1 to 2.6 V and 1 mV/s)

Here, SiO$_2$ and Si generate a reversible capacity through an alloying reaction with lithium (Si+xLi$^+$+xe$^-$→Li$_x$Si). As illustrated in FIG. 10, the reduction peaks appeared at 0.5 V and 0.3 V during the first charging, and the reduction peak appeared only at 0.5 V and the reduction peak disappeared at 0.3 V during the second charging. This also means a reversible capacity appearing as lithium is intercalated into SiOx to form Li$_x$Si, but it is thought that the disappearance of the reduction peak at 0.3 V and the decrease in reduction peak at 0.5 V result from an irreversible reaction of $SiO_2$ and lithium and are associated with the decomposition of the electrolyte and production of the solid electrolyte interface (SEI). The oxidation peat at 0.4 V indicates a reverse reaction in which Si is produced while lithium is deintercalated from LixSi, and from this, it can be seen that $SiO_2$ is regenerated.

Galvanostatic Charge-Discharge

FIG. 11 is change curves of a discharge capacity for investigating cycling stability when the carbon nanofiber and $SiO_2$/CNFs are used as an anode material of the Li secondary battery. As illustrated in FIG. 11, it could be seen that the initial discharge capacity of the carbon nanofiber exhibited about 300 mAh/g, an almost constant discharge capacity was exhibited even at 30 cycles, and the carbon nanofiber had high cycling stability.

The discharge capacity of $SiO_2$/CNFs at 2 and 3 cycles was 2,053 mAh/g and 1,866 mAh/g, respectively, which exhibit a relatively high discharge capacity, but the discharge capacity at 29 cycles was 1,295 mAh/g, which exhibits a discharge maintenance ratio by 63% compared to the discharge maintenance ratio of 2 cycles. From this, it could be seen that the carbon nanofiber exhibited a high discharge capacity in comparison with a low capacity, and $SiO_2$/CNFs exhibited a lower discharge capacity than that of the carbon nanofiber, but exhibited a relatively stable cycling stability and a high discharge capacity of 1,295 mAh/g even at 29 cycles.

FIG. 12 is curves of capacity versus cycle number in $SiO_2$/CNFs. As illustrated in FIG. 12, at 2 and 3 cycles, the discharge and charge capacities were 2053 and 1687 mAh/g and 1866 and 1682 mAh/g, respectively, which exhibited coulombic efficiency of 82% and 90%. As the cycle number was increased, the coulombic efficiency was gradually increased such that the coulombic efficiency of 96% was exhibited at 29 cycles. As described above, the reason for the big irreversible capacity at the initial cycle seems to result from an irreversible reaction of $SiO_2$ and Li and production of SEI as can be seen from the results of the cyclic voltammetry.

CONCLUSION

A carbon nanofiber was grown on a carbon fiber textile on the basis of a Ni and Cu catalyst by a CVD method, and the carbon nanofiber was coated with $SiO_2$ by hydrolyzing TEOS. Characteristics of synthesized carbon nanofiber and $SiO_2$/CNFs composite were analyzed by SEM, EDS, Raman, TEM, XRD, and XPS, and a three-electrode battery was formed using these materials as an anode material of an Li secondary battery, electrochemical characteristics thereof were measured by galvanostatic charge-discharge and cyclic voltammetry, and based on this, the following conclusion was made.

1. The carbon nanofiber was grown to have an average diameter of 40 nm at on the catalyst deposited in an aqueous Ni solution, and Y-shaped carbon nanofiber in the form of branch was grown.

2. The carbon nanofiber grown on the catalyst deposited in a Ni—Cu mixed solution had an average diameter of 300 nm and was grown as multi-directionally Y-shaped carbon nanofiber.

3. On a substrate in which Ni was deposited on a carbon fiber textile on which Cu was pre-deposited, the most uniform carbon nanofiber having an average diameter of 33 nm in the twisted form was grown.

4. As a result of the Raman analysis, the intensity ratios of D-band/G-band of the carbon nanofibers grown on the Ni—Cu and Ni/Cu bimetallic catalysts were 0.80 and 0.83, respectively, which are lower than that of the Ni single catalyst, and the carbon nanofiber with a higher ratio of the $sp^2$ hybrid bond was grown.

5. As a result of the TEM, XPS, and XRD analyses, it could be seen that TEOS was hydrolyzed, and thus $SiO_2$ was uniformly coated on the carbon nanofiber.

6. As a result of the cyclic voltammetry, $SiO_2$ was alloyed with LixSi and was regenerated as $SiO_2$, an oxidation peak appeared at 0.4 V, and a reduction peak appeared at 0.5 V and 0.3 V.

7. As a result of the galvanostatic charge-discharge, at 29 cycles, $SiO_2$/CNFs exhibited a discharge capacity of 1,295 mAh/g, which is much higher than that of the carbon nanofiber exhibiting a discharge capacity of 304 mAh/g, and exhibited a high capacity maintenance ratio of 63% in comparison with 2 cycles.

From the foregoing, the present invention has been illustrated and described in relation to specific examples, but a person skilled in the art will easily understand that various modifications and variations are possible without departing from the spirit and scope of the invention shown in the claims.

INDUSTRIAL APPLICABILITY

The present invention can simply and easily manufacture an anode material of a lithium secondary battery having good-quality electrochemical characteristics may be manufactured by mixing a Ni—Cu bimetallic catalyst, Si particles, and a Ni—Cu catalyst, and can manufacture a good-quality lithium secondary battery having high charge and discharge efficiency, a high capacity, and a long lifespan using the anode material, and thus is highly industrially available.

The invention claimed is:

1. A method for manufacturing a $SiO_2$/carbon nanofiber composite on a basis of a nickel/copper catalyst using electrophoretic deposition, the method comprising:
   (a) depositing a nickel and copper catalyst on a carbon fiber textile by electrophoretic deposition using a carbon electrode as an anode and the carbon fiber textile as a cathode;
   (b) reducing the carbon fiber textile on which the nickel and copper catalyst is deposited;
   (c) growing carbon nanofiber on the reduced carbon fiber textile by chemical vapor deposition using an ethylene gas; and
   (d) coating the grown carbon nanofiber with $SiO_2$, wherein step (d) comprises:
      (d1) oxidizing the grown carbon nanofiber in nitric acid to wash the carbon nanofiber with distilled water; and
      (d2) dissolving TEOS in ethyl alcohol to form a TEOS solution, and dispersing the carbon nanofiber in the TEOS solution to perform a reaction.

2. The method of claim 1, wherein step (a) is a step of depositing nickel on the carbon fiber textile in an aqueous nickel-copper mixed solution.

3. The method of claim 1, wherein step (a) comprises:
   depositing the copper on the carbon fiber textile; and
   depositing nickel on the carbon fiber textile on which the copper is deposited in an aqueous nickel solution.

4. The method of claim 1, wherein in step (b), the carbon fiber textile on which the nickel and copper catalyst is deposited is reduced using an $H_2/N_2$ gas in the tube furnace.

5. The method of claim 4, wherein in step (c), the carbon nanofiber is grown by performing a reaction in the tube furnace, and using a mass flow rate controller to flow a hydrogen gas together with the ethylene gas.

6. The method of claim 5, wherein step (c) comprises:
introducing the carbon fiber textile, on which the nickel and copper catalyst is deposited, into a tube furnace of a reactor, and heating the carbon fiber textile to 700° C. at a rate of 12° C./min and flowing a nitrogen ($N_2$) gas; and
flowing a nitrogen gas including 20% of hydrogen into the reactor for 2 hours.

7. The method of claim 1, wherein in step (d2), the reaction is performed at 50° C. for 24 hours by dispersing the carbon nanofiber and adding ammonia water thereto.

8. A method for manufacturing a secondary battery using a $SiO_2$/carbon nanofiber on a basis of a nickel/copper catalyst, the method comprising:
(a) to depositing a nickel and copper catalyst on a carbon fiber textile by electrophoretic deposition using a carbon electrode as an anode and the carbon fiber textile as a cathode;
(b) reducing the carbon fiber textile on which the nickel and copper catalyst is deposited;
(c) growing carbon nanofiber on the reduced carbon fiber textile by chemical vapor deposition using an ethylene gas;
(d) coating the grown carbon nanofiber with $SiO_2$, wherein step (d) comprises:
(d1) oxidizing the grown carbon nanofiber in nitric acid to wash the carbon nanofiber with distilled water; and
(d2) dissolving TEOS in ethyl alcohol to form a TEOS solution, and dispersing the carbon nanofiber in the TEOS solution to perform a reaction; and
(e) manufacturing a three-electrode secondary battery composed of the coated carbon nanofiber as a working electrode (WE), Li metal as a counter electrode (CE) and a reference electrode, and a separation membrane containing an electrolyte.

9. The method of claim 8, wherein step (a) is a step of depositing nickel on the carbon fiber textile in an aqueous nickel-copper mixed solution.

10. The method of claim 8, wherein step (a) comprises:
depositing the copper on the carbon fiber textile; and
depositing nickel on the carbon fiber textile on which the copper is deposited in an aqueous nickel solution.

11. The method of claim 8, wherein in step (d2), a reaction is performed at 50° C. for 24 hours by dispersing the carbon nanofiber and adding ammonia water thereto.

12. The method of claim 8, wherein the electrolyte is formed by dissolving $LiCO_4$ in a solution in which propylene carbonate and ethylene carbonate is mixed at a ratio of 1:1.

13. The method of claim 2, wherein in step (b), the carbon fiber textile on which the nickel and copper catalyst is deposited is reduced using an $H_2/N_2$ gas in the tube furnace.

14. The method of claim 3, wherein in step (b), the carbon fiber textile on which the nickel and copper catalyst is deposited is reduced using an $H_2/N_2$ gas in the tube furnace.

* * * * *